US011818295B1

(12) United States Patent
Pandiri et al.

(10) Patent No.: US 11,818,295 B1
(45) Date of Patent: Nov. 14, 2023

(54) LIFECYLE CALL ROUTING AND MANAGEMENT IN A CUSTOMER SERVICE REPRESENTATIVE MANAGEMENT COMPUTING SYSTEM WITH A REMOTE VOICE PROCESSING GATEWAY

(71) Applicant: 3CLogic, Inc., Rockville, MD (US)

(72) Inventors: Navya Pandiri, Carrollton, TX (US); Denis A. Seynhaeve, Annapolis, MD (US)

(73) Assignee: 3CLOGIC, INC., Rockville, MD (US)

( * ) Notice: Subject to any disclaimer, the term of this patent is extended or adjusted under 35 U.S.C. 154(b) by 0 days.

(21) Appl. No.: 17/951,856

(22) Filed: Sep. 23, 2022

(51) Int. Cl.
*H04M 3/00* (2006.01)
*H04M 3/523* (2006.01)

(52) U.S. Cl.
CPC ....... *H04M 3/5232* (2013.01); *H04M 3/5231* (2013.01)

(58) Field of Classification Search
CPC ............................ H04M 3/5232; H04M 3/5231
USPC ....... 379/265.01–265.14, 266.01–265.1, 309
See application file for complete search history.

(56) References Cited

U.S. PATENT DOCUMENTS

| | | | | |
|---|---|---|---|---|
| 8,218,753 B2 * | 7/2012 | Khouri | ..................... | H04M 3/42 379/202.01 |
| 10,356,244 B1 * | 7/2019 | Sengupta | .............. | H04L 43/045 |
| 2001/0024497 A1 * | 9/2001 | Campbell | ........... | H04M 3/5191 379/265.09 |
| 2009/0285381 A1 * | 11/2009 | Phelps | .................... | H04M 3/54 379/211.02 |

* cited by examiner

*Primary Examiner* — William J Deane, Jr.
(74) *Attorney, Agent, or Firm* — CRGO Global; Steven M. Greenberg

(57) ABSTRACT

Call routing and management for customer service includes responding to the receipt of a telephone call in a voice gateway by generating a context artifact characterizing at least one aspect of the call and appending a call identifier to the artifact such that the artifact is then transmitted to a CSR management computing system along with a request to assign the call to a particular CSR agent. The call is then parked in a call queue until receiving, from the CSR management computing system, an assigned agent and a network endpoint address to the assigned agent. Finally, a two-way audio link is established between the voice gateway and the network endpoint address. Consequently, the call is removed from the call queue, and audio is bridged between the two-way audio link and the telephone call.

15 Claims, 3 Drawing Sheets

LIFECYLE CALL ROUTING AND MANAGEMENT IN A CUSTOMER SERVICE REPRESENTATIVE MANAGEMENT COMPUTING SYSTEM WITH A REMOTE VOICE PROCESSING GATEWAY

BACKGROUND OF THE INVENTION

Field of the Invention

The present invention relates to the technical field of call routing for customer service representative (CSR) agent call handling.

Description of the Related Art

A CSR productivity suite of applications refers to an electronic suite of computing applications arranged to support the daily responsibilities of a CSR agent in a customer service environment such as a call center. The customer service environment is a customer-facing component of a company and provides support for customers utilizing the products and services of the company. Generally, the success of a customer service environment relates directly to the speed in which a response can be provided to the customer and the pertinence of the response to the customer inquiry. To that end, the efficient operation of the customer service environment can be integral to the success of the company.

Historically, the customer service environment included a call center of CSR agents that ranged from just a few CSR agents answering customer telephone calls on a first come, first served basis whilst providing responses to inquiries off-the-cuff, to sophisticated, stand-alone call center facilities employing hundreds if not thousands of CSR agents either centrally, or in a distributed manner. In either case, though, live customer assistance provided by a CSR agent can be expensive for many organizations. Yet many customer inquiries are so routine and predictable that live human intervention is not always required. As such, in many cases, responses to customer inquiries can be automated, for example through well-known interactive voice response (IVR) systems. Just as companies often prefer to handle customer service inquiries in an automated, passive way to avoid the expense of employing a multiplicity of CSRs, customers often prefer a passive mode of obtaining customer service. For those customers preferring a passive mode of obtaining customer service, message-based customer service has become a desirable tool—particularly the use of e-mail-based customer service inquiries and also live chat sessions with CSR agents.

To that end, the modern CSR management computing system offers a separate management interface to each CSR agent providing supporting both voice interactions with a customer engaging with the CSR agent by telephone, and also digital interactions with a customer engaging with the CSR agent electronically by way of chat or asynchronous messaging. To the extent that these different modalities generally are exclusive from one another, each receives a different user interface providing a different user experience to the CSR agent. As such, the CSR agent receives a different experience depending upon the modality chosen to communicate with a customer.

Complicating matters, telephone call routing integral to the CSR management computing system requires substantial administrative configuration and coordination to assure proper routing of inbound calls from customer to the appropriate CSR, while also assuring proper routing of inbound electronic messages to the appropriate CSR. Finally, to the extent that the load imparted upon each modality can differ dramatically at any given time, poor load management resulting from inadequate synchronization of both modalities can occur as to each CSR assigned to receive customer inquiries.

BRIEF SUMMARY OF THE INVENTION

Embodiments of the present invention address technical deficiencies of the art in respect to call center routing—supplementing a CSR management computing system to provide externally to the CSR management computing system, a unified user experience to each CSR agent while obviating the need to administratively configure the CSR management computing system with complex routing rules for different modalities of interaction between the CSR agents and customers. To that end, embodiments of the present invention provide for a novel and non-obvious method for call routing for CSR handling. Embodiments of the present invention also provide for a novel and non-obvious computing device adapted to perform the foregoing method. Finally, embodiments of the present invention provide for a novel and non-obvious data processing system incorporating the foregoing device in order to perform the foregoing method.

In one embodiment of the invention, a call routing and management method for customer service includes the establishment of a communicative coupling between a voice gateway and a CSR management computing system over a data communication network. The method additionally includes the receipt of multiple, different telephone calls in the voice gateway from over a PSTN. Finally, the method includes, for each corresponding one of the telephone calls, a generation of a context artifact characterizing at least one aspect of the corresponding one of the telephone calls and the appendage of the artifact a call identifier for the corresponding one of the telephone calls such that the context artifact is transmitted over the communicative coupling to the CSR management computing system along with a request to assign the corresponding one of the telephone calls to a particular CSR agent amongst multiple, different CSR agents registered with the CSR management computing system.

Thereafter, one of the CSR agents may be assigned to the corresponding call, for instance, based upon a pop-up dialog presented in a workspace user interface of the CSR management computing system for the selected CSR agent (including information associated with the context artifact) in response to which the selected CSR agent may accept the assignment. During this time, the corresponding call may be parked in a call queue until receiving from the CSR management computing system from over the data communications network, in response to the request, an assigned one of the CSR agents and a network endpoint address to the assigned one of the CSR agents. With the network endpoint address, a two-way audio link may be established over the data communications network between the voice gateway and the network endpoint address. Subsequently, the corresponding call may be removed from the call queue and audio between the two-way audio link and the corresponding one of the telephone calls may be bridged.

In this way, because an association is recorded as between the telephone call and the network address of the assigned one of the agents outside of the purview of the CSR management computing system, should the bridge become disrupted or should the two-way audio link drop, a new two-way audio link can be bridged to the same CSR agent without requiring the CSR management computing system to manage continuity of communications with the corresponding one of the telephone calls. Further, should a different handling of the corresponding one of the telephone calls be determined, the corresponding one of the telephone calls can be routed to a different specified one of the CSR agents without requiring the CSR management computing system to assure the continuity of the communications with the corresponding one of the telephone calls.

In another embodiment of the invention, a data processing system is adapted for call routing and management. The system includes a host computing platform if one or more computers, each with memory and one or processing units including one or more processing cores. The platform further includes a communicative coupling over a data communication network between a voice gateway and a CSR management computing system. Finally, the system includes a call routing and management module including computer program instructions enabled while executing in the memory of at least one of the processing units of the host computing platform to perform a call routing and management process for each of a multiplicity of different telephone calls received in the voice gateway from over a PSTN.

Specifically, the process includes generating a context artifact characterizing at least one aspect of the corresponding one of the telephone calls and appending to the artifact a call identifier for the corresponding one of the telephone calls. The process additionally includes transmitting the context artifact over the communicative coupling to the CSR management computing system along with a request to assign the corresponding one of the telephone calls to a CSR agent amongst a multiplicity of CSR agents registered with the CSR management computing system. In this regard, the CSR management computing system upon receiving the request selects a specific one of the CSR agents for assignment to the one of the telephone calls, for instance based upon agent finding rules also known as routing rules established within the CSR management computing system.

The process further includes directing the voice gateway to park the corresponding one of the telephone calls in a call queue and receiving from the CSR management computing system over the data communication network in response to the request, an assigned one of the multiplicity of CSR agents including a network endpoint address to the assigned one of the multiplicity of CSR agents. Finally, the process includes establishing a two-way audio link over the data communication network between the voice gateway and the network endpoint address of the assigned one of the multiplicity of CSR agents, removing the corresponding one of the telephone calls from the call queue and bridging audio between the two-way audio link and the corresponding one of the telephone calls.

Several aspects of the foregoing embodiment are provided. For instance, in one aspect of the embodiment, the CSR management computing system specifies the queue based upon the context artifact. In another aspect of the embodiment, a corresponding voice interaction record is updated in the CSR management computing system at each change of state of handling of the corresponding one of the telephone calls throughout an entire lifecycle of the corresponding one of the telephone calls, through an application programming interface (API) call of the CSR management computing system so that the CSR management computing system may maintain an awareness of the interaction reflected by the corresponding one of the telephone calls even though the corresponding one of the calls is managed and maintained externally to the CSR management computing system.

In yet another aspect of the embodiment, a policy for the queue may be retrieved and pre-stored logic associated with the policy executed. To that end, the policy can include a courtesy callback option. As another example, the policy can include a music on hold option. Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for call routing and management for customer service. In accordance with an embodiment of the invention, an inbound telephone call is received in a voice gateway and an artifact generated including both a characterization of an aspect of the call such as a customer identity, topic of concern or case identifier, and also an identifier for the call itself. The artifact is then routed to the CSR management computing system while the call is parked into a call queue and an interaction record is updated in the CSR management computing system indicating a state of the call. The call remains parked in the call queue until a response is received from the CSR management computing system.

The artifact upon receipt by the CSR management computing system is then used as context for a pop-up rendered in the workspace user interface of the CSR management computing system of an assigned CSR agent. The pop-up prompts the assigned CSR agent to accept the call without requiring the CSR agent to navigate to a separate call management portion of the CSR management computing system. Upon receipt from the CSR management computing system of a network endpoint address for an assigned CSR agent for the call, a two-way audio link is established with the network endpoint address and the voice gateway. Thereafter, the call is removed from the call queue and once again, the interaction record is updated in the CSR management computing system with a new status of the call. Finally, the audio is bridged between the two-way audio link and the telephone call.

Figure 1:
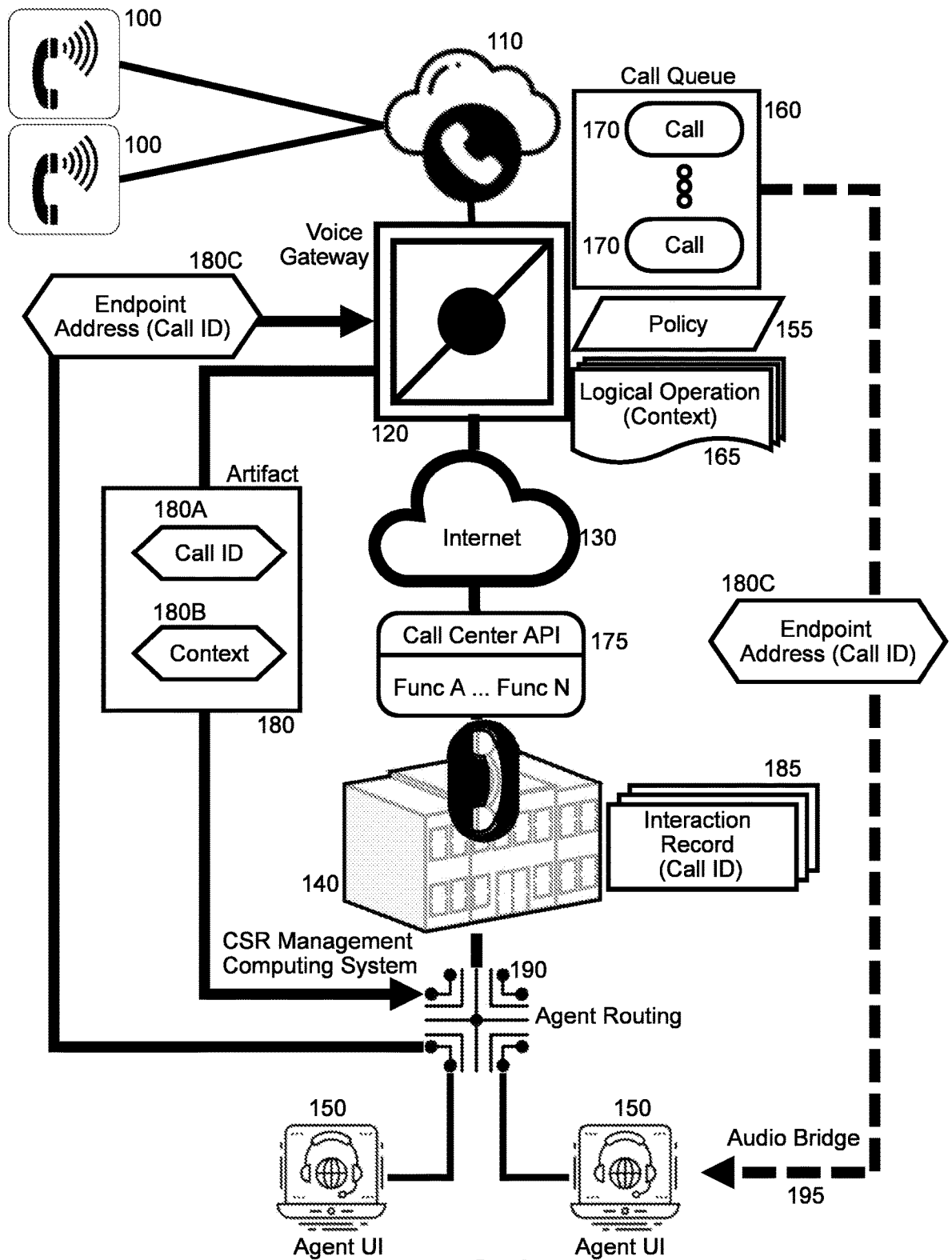
FIG. 1 is a pictorial illustration reflecting different aspects of a process of call routing and management for customer service.

In illustration of one aspect of the embodiment, FIG. 1 pictorially shows a process of call routing and management for customer service. As shown in FIG. 1, a voice processing gateway 120 receives multiple, telephone calls 170 from respectively different callers 100 from over a public switched telephone network (PSTN) 110 though it is recognized that at least a portion of one or more of the telephone calls 170 may traverse the global Internet. Once one of the telephone calls 170 is received in the voice processing gateway 120, a call identifier 180A is assigned to the received one of the telephone calls 170 and the received one of the calls 170 is parked in call queue 160 associated with the voice processing gateway 120.

The voice processing gateway 120 then determines a context 180B for the one of the telephone calls 170. The context 180B characterizes at least one aspect of the one of the telephone calls 170, such as characterizing information regarding an associated one of the callers 100 including demographic information of the associated one of the callers 100, or characterizing information regarding the purpose of the one of the telephone calls 170 such as a specified topic, or characterizing information regarding an organization to which the associated one of the callers 100 belongs, such as an organization name, geographic location of the organization, role within the organization, and the like.

Subsequently, one or more logical operations 165 may be triggered in the voice processing gateway 120 in response to the context 180B, such as a courtesy callback operation, or a music on hold operation. The logical operations 165 can be defined according to a policy 155 mapping different contexts to corresponding ones of the logical operations 165. To that end, the context 180B can be mapped to one or more of the logical operations 165 according to the policy and the mapped ones of the logical operations 165 may be executed responsive to the context 180B.

Concurrently, the voice processing gateway 120 invokes an API 175 to the CSR management computing system in order write an interaction record 185 in the CSR management computing system recording the one of the telephone calls 170 as an interaction along with the identifier 180A and indicating a state of one of the telephone calls 170 as having been parked in the call queue 160. As well, the voice processing gateway 120 generates an artifact 180 for the one of the calls 170, including the identifier 180A for the one of the calls 170 and the context 180B for the one of the calls 170. Once the artifact 180 has been generated in the voice processing gateway 120, the voice processing gateway 120 transmits the artifact 180 to a CSR management computing system 140 over a data communications network 130.

The CSR management computing system 140, upon receiving the artifact 180 from the voice processing gateway 120, invokes agent assignment logic 190 with at least a portion of the context 180B in order to specify one of a multiplicity of agents selected to receive the one of the telephone calls 170. In this regard, the agent assignment logic 190 provoked by the artifact 180 triggers a display of a pop-up message in an agent user interface 150 for a selected one of the agents and upon receiving acceptance of the one of the telephone calls 170 through the agent user interface 150, the agent assignment logic 190 determines a network address 180C for an endpoint corresponding to the selected one of the agents and returns the determined network address 180C over the data communications network 130 to the voice processing gateway 120.

Upon receipt of the network address 180C, the voice processing gateway 120 locates the one of the telephone calls 170 parked in the queue 160 corresponding to the identifier 180A and establishes a two-way audio bridge 195 between the one of the telephone calls 170 and the determined network address 180B of the artifact. The two-way audio bridge 195 having been established, the voice processing gateway 120 invokes the API 175 to the CSR management computing system 140 once again in order update the interaction record 185 in the CSR management computing system 140 indicating a change in the state of one of the telephone calls 170 as having been removed from the call queue 160 and assigned to the selected one of the agents 150A. Thereafter, throughout the lifecycle of the one of the telephone calls 170, any change of state of the one of the telephone calls 170 may be indicated in the interaction record 185 including a loss of connection for the one of the telephone calls 170, a change in assignment of the selected one of the agents 150, or the placement back into the call queue 160 of the one of the telephone calls 170.

Figure 2:
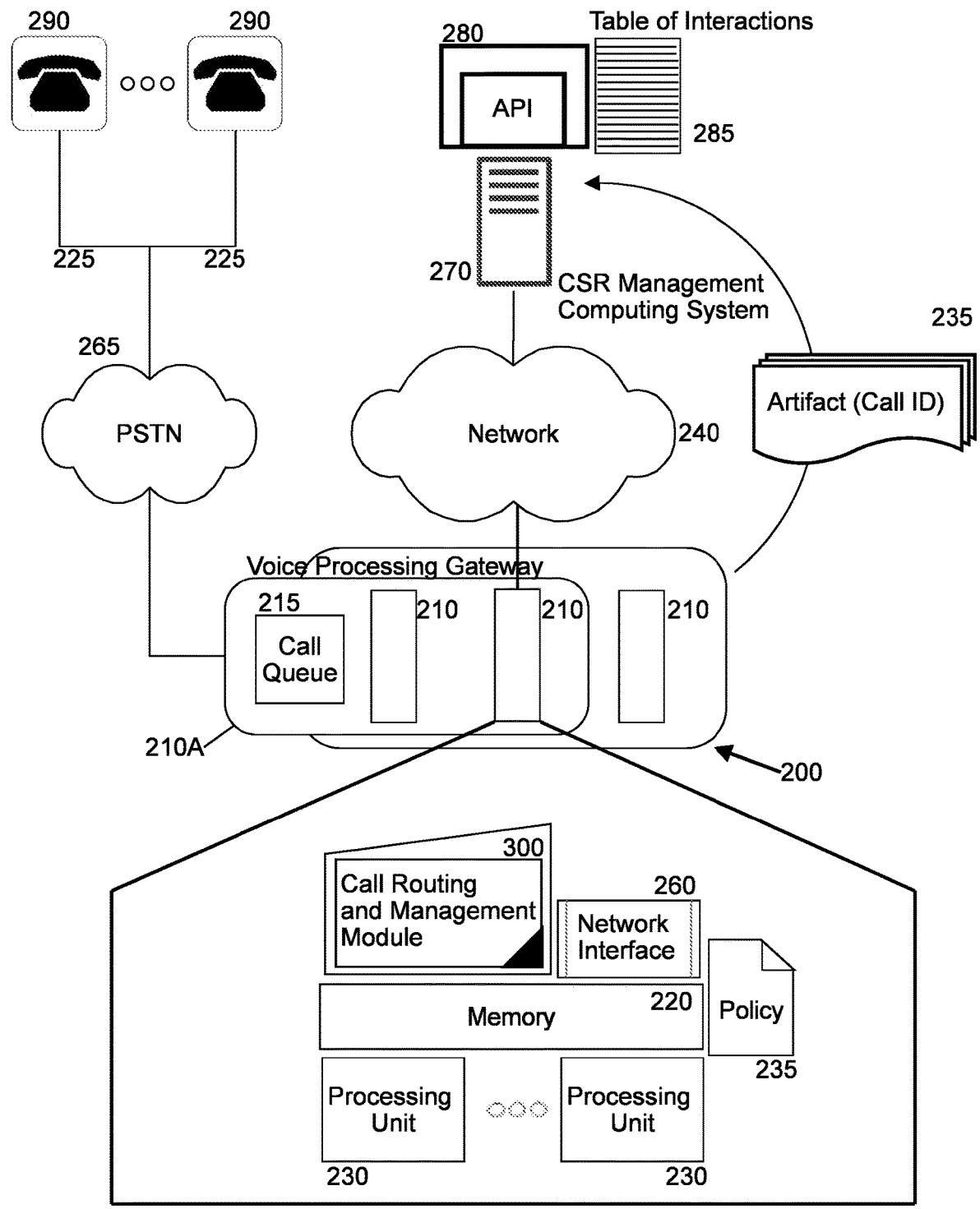
FIG. 2 is a block diagram depicting a data processing system adapted to perform one of the aspects of the process of FIG. 1; and, FIG. 3 is a flow chart illustrating one of the aspects of the process of FIG. 1.

Aspects of the process described in connection with FIG. 1 can be implemented within a data processing system. In further illustration, FIG. 2 schematically shows a data processing system adapted to perform call routing and management for customer service. In the data processing system illustrated in FIG. 1, a host computing platform 200 is provided. The host computing platform 200 includes one or more computers 210, each with memory 220 and one or more processing units 230. The computers 210 of the host computing platform (only a single computer shown for the purpose of illustrative simplicity) can be co-located within one another and in communication with one another over a local area network, or over a data communications bus, or the computers can be remotely disposed from one another and in communication with one another through network interface 260 over a data communications network 240.

The computers 210 of the host computing platform 200 define a voice processing gateway 210A including a call queue 215. The voice processing gateway 210A in turn is communicatively coupled over data communications network 240 to a remotely disposed CSR management computing system 270. The voice processing gateway 210 also is communicatively coupled over PSTN 265 to different telephonic communicators 290, such as different cellular and wire-bound telephones as well as different soft phone defined in computer program logic and executing in a host device. Of note, ones of the telephonic communicators 290 also may be communicatively coupled to the voice processing gateway 210 over the data communications network 240. The voice processing gateway 210A is adapted to receive and maintain different telephone calls 225 from the telephonic communicators 290.

Notably, a computing device 250 including a non-transitory computer readable storage medium can be included with the data processing system 200 and accessed by the processing units 230 of one or more of the computers 210. The computing device stores 250 thereon or retains therein a program module 300 that includes computer program instructions which when executed by one or more of the processing units 230, performs a programmatically executable process for call routing and management for customer service. Specifically, the program instructions during execution detect the receipt of different telephone calls in the voice processing gateway 210A from different ones of the telephonic communicators 290.

In response to the detection of the receipt of each one of the telephone calls 225, the program instructions direct the voice processing gateway 210 to park the one of the telephone calls in the call queue 215. Thereafter, the program instructions invoke the API 280 of the CSR management computing system 270 to create a new interaction record in the table of interactions 285 for the one of the telephone calls 225. The program instructions then determine a context for the one of the telephone calls 225 and inspect a policy 235 in order to map the context to one or more logical operations for which the program instructions then trigger execution thereof. As well, the program instructions generate an artifact data structure 245 for the one of the telephone calls 225 encapsulating the identifier for the one of the telephone calls 225 and the context for the one of the telephone calls 225. Subsequently, the program instructions transmit the artifact data structure 245 to the CSR management computing system 270 in order to receive in response a network address endpoint for an assigned agent.

The program instructions upon receiving from the CSR management computing system 270 the network address endpoint for the assigned agent, the program instructions establish a two-way audio bridge between the one of the telephone calls 225 and the network address endpoint while removing the one of the telephone calls 225 from the call queue 215. Once again, the program instructions invoke the API 280 to update the interaction record 285 indicating the establishment of a telephonic communications session with the assigned agent. Finally, the program instructions respond to state changes of the one of the telephone calls 225 during the lifecycle of the one of the telephone calls 225 by responsively invoking the API 280 to update the interaction record 285 for the telephonic communications session of the one of the telephone calls 225.

Figure 3:
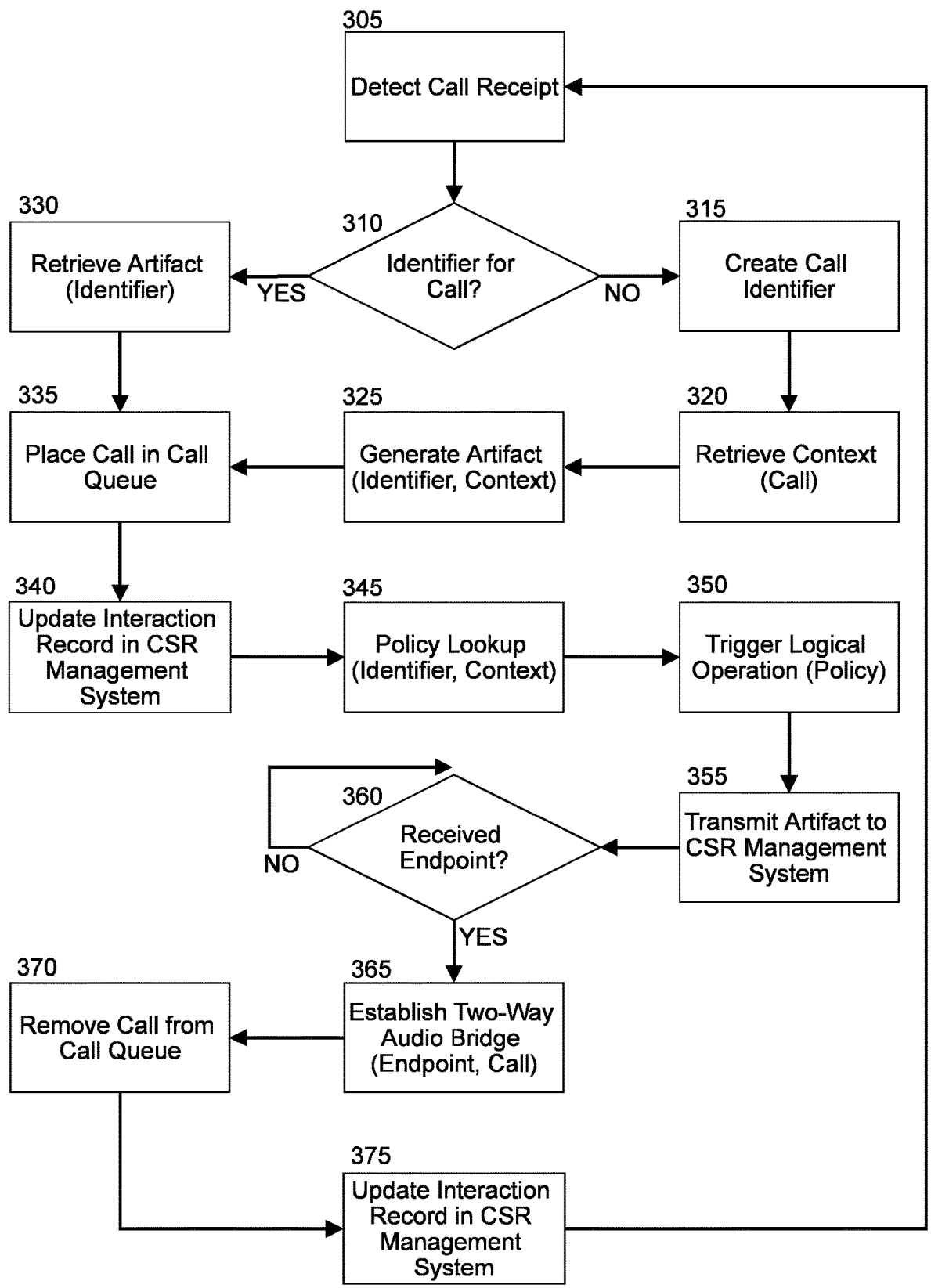

In further illustration of an exemplary operation of the module, FIG. 3 is a flow chart illustrating one of the aspects of the process of FIG. 1. Beginning in block 305, the receipt of a telephone call from a telephonic communicator in the voice processing gateway is detected and in decision block 310, it is determined if an identifier already exists for the telephone call. If not, in block 315 an identifier is created for the telephone call and in block 320 a context is retrieved for the telephone call, for instance by querying one or more tables relating caller information from the call to extended contextual information. Then, in block 325, an artifact data structure is created encapsulating the identifier and context. On the other hand, if in decision block 310, it is determined that an identifier already exists, in block 330 an existing artifact data structure is retrieved and the associated context extracted therefrom.

In block 335, the telephone call is placed in a call queue, and in block 340 an API for a CSR management computing system is accessed to update an interaction record for the call in the CSR management computing system. Then, in block 345 a policy is consulted with the identifier and optionally the context in order to trigger in block 350 one or more logical operations for execution while the telephone call remains in the call queue. In block 355, the artifact data structure is transmitted to the CSR management computing system so that the CSR management computing system may execute agent assignment logic to assign the telephone call to an agent. In decision block 360, it is then determined if a network address endpoint for the assigned agent has been assigned to the telephone call by receiving from the CSR management computing system the network address endpoint and the identifier. If so, in block 365, a two-way audio bridge is established between the network address endpoint and the telephone call and in block 370 the telephone call is removed from the call queue. Finally, in block 375 the API is invoked again to update the interaction record for the telephone call. Then, the process returns to block 305.

Importantly, during the lifecycle of the telephone call, the interaction record of the CSR management computing system is maintained remotely from the voice processing gateway. To that end, whenever a telephone call disconnects from the voice processing gateway, program instructions associated with the voice processing gateway invoke the API to update the status of the interaction record indicating the termination of the telephone call. Likewise, whenever a telephone call reconnects after termination, the program instructions invoke the API to update the status of the interaction record indicating a parked telephone call previously established awaiting re-establishment with a designated agent in the CSR management computing system. In this way, the CSR management computing system can maintain an awareness through the lifecycle of the interaction with a calling customer of the status of one or more telephone calls constituting a single interaction even though the CSR management computing system does not itself deploy a voice processing gateway integral to the CSR management computing system.

Of import, the foregoing flowchart and block diagram referred to herein illustrate the architecture, functionality, and operation of possible implementations of systems, methods, and computing devices according to various embodiments of the present invention. In this regard, each block in the flowchart or block diagrams may represent a module, segment, or portion of instructions, which includes one or more executable instructions for implementing the specified logical function or functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

More specifically, the present invention may be embodied as a programmatically executable process. As well, the present invention may be embodied within a computing device upon which programmatic instructions are stored and from which the programmatic instructions are enabled to be loaded into memory of a data processing system and executed therefrom in order to perform the foregoing programmatically executable process. Even further, the present invention may be embodied within a data processing system adapted to load the programmatic instructions from a computing device and to then execute the programmatic instructions in order to perform the foregoing programmatically executable process.

To that end, the computing device is a non-transitory computer readable storage medium or media retaining therein or storing thereon computer readable program instructions. These instructions, when executed from memory by one or more processing units of a data processing system, cause the processing units to perform different programmatic processes exemplary of different aspects of the programmatically executable process. In this regard, the processing units each include an instruction execution device such as a central processing unit or "CPU" of a computer. One or more computers may be included within the data processing system. Of note, while the CPU can be a single core CPU, it will be understood that multiple CPU cores can operate within the CPU and in either instance, the instructions are directly loaded from memory into one or more of the cores of one or more of the CPUs for execution.

Aside from the direct loading of the instructions from memory for execution by one or more cores of a CPU or multiple CPUs, the computer readable program instructions described herein alternatively can be retrieved from over a computer communications network into the memory of a computer of the data processing system for execution therein. As well, only a portion of the program instructions may be retrieved into the memory from over the computer communications network, while other portions may be loaded from persistent storage of the computer. Even further, only a portion of the program instructions may execute by one or more processing cores of one or more CPUs of one of the computers of the data processing system, while other portions may cooperatively execute within a different computer of the data processing system that is either co-located with the computer or positioned remotely from the computer over the computer communications network with results of the computing by both computers shared therebetween.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A call routing and management method for customer service comprising:
    establishing a communicative coupling between a voice gateway and a customer service representative (CSR) management computing system over a data communication network;
    receiving a multiplicity of different telephone calls in the voice gateway from over a public switched telephone network (PSTN); and,
    for each corresponding one of the telephone calls:
        generating a context artifact characterizing at least one aspect of the corresponding one of the telephone calls and appending to the artifact a call identifier for the corresponding one of the telephone calls;
        transmitting the context artifact over the communicative coupling to the CSR management computing system along with a request to assign the corresponding one of the telephone calls to a particular agent amongst a multiplicity of agents registered with the CSR management computing system;
        parking the corresponding one of the telephone calls in a call queue;
        receiving from the CSR management computing system over the data communications network in response to the request, an assigned one of the multiplicity of agents including a network endpoint address to the assigned one of the multiplicity of agents;
        establishing a two-way audio link over the data communications network between the voice gateway and the network endpoint address of the assigned one of the multiplicity of agents;
        removing the corresponding one of the telephone calls from the call queue and bridging audio between the two-way audio link and the corresponding one of the telephone calls.

2. The method of claim 1, further comprising updating a corresponding voice interaction record in the CSR management computing system at each change of state of handling of the corresponding one of the telephone calls throughout an entire lifecycle of the corresponding one of the telephone calls, through an application programming interface (API) call of the CSR management computing system.

3. The method of claim 1, further comprising retrieving a policy for the queue and executing pre-stored logic associated with the policy.

4. The method of claim 3, wherein the policy includes a courtesy callback option.

5. The method of claim 3, wherein the policy includes a music on hold option.

6. A data processing system adapted for call routing and management, the system comprising:
    a host computing platform comprising one or more computers, each with memory and one or processing units including one or more processing cores, the platform comprising a communicative coupling over a data communication network between a voice gateway and a customer service representative (CSR) management computing system; and,
    a call routing and management module comprising computer program instructions enabled while executing in the memory of at least one of the processing units of the host computing platform to perform for each of a multiplicity of different telephone calls received in the voice gateway from over a public switched telephone network (PSTN):
        generating a context artifact characterizing at least one aspect of the corresponding one of the telephone calls and appending to the artifact a call identifier for the corresponding one of the telephone calls;
        transmitting the context artifact over the communicative coupling to the CSR management computing system along with a request to assign the corresponding one of the telephone calls to a particular agent amongst a multiplicity of agents registered with the CSR management computing system;
        directing the voice gateway to park the corresponding one of the telephone calls in a call queue;
        receiving from the CSR management computing system over the data communication network in response to the request, an assigned one of the multiplicity of agents including a network endpoint address to the assigned one of the multiplicity of agents;
        establishing a two-way audio link over the data communication network between the voice gateway and the network endpoint address of the assigned one of the multiplicity of agents;

removing the corresponding one of the telephone calls from the call queue and bridging audio between the two-way audio link and the corresponding one of the telephone calls.

7. The system of claim 6, further comprising updating a corresponding voice interaction record in the CSR management computing system at each change of state of handling of the corresponding one of the telephone calls throughout an entire lifecycle of the corresponding one of the telephone calls, through an application programming interface (API) call of the CSR management computing system.

8. The system of claim 6, further comprising retrieving a policy for the queue and executing pre-stored logic associated with the policy.

9. The system of claim 8, wherein the policy includes a courtesy callback option.

10. The system of claim 8, wherein the policy includes a music on hold option.

11. A computing device comprising a non-transitory computer readable storage medium having program instructions stored therein, the instructions being executable by at least one processing core of a processing unit to cause the processing unit to perform a method for call routing and management, the method including:
  establishing a communicative coupling between a voice gateway and a customer service representative (CSR) management computing system over a data communication network;
  receiving a multiplicity of different telephone calls in the voice gateway from over a public switched telephone network (PSTN); and,
  for each corresponding one of the telephone calls:
    generating a context artifact characterizing at least one aspect of the corresponding one of the telephone calls and appending to the artifact a call identifier for the corresponding one of the telephone calls;
    transmitting the context artifact over the communicative coupling to the CSR management computing system along with a request to assign the corresponding one of the telephone calls to a particular agent amongst a multiplicity of agents registered with the CSR management computing system;
    parking the corresponding one of the telephone calls in a call queue;
    receiving from the CSR management computing system over the data communications network in response to the request, an assigned one of the multiplicity of agents including a network endpoint address to the assigned one of the multiplicity of agents;
    establishing a two-way audio link over the data communications network between the voice gateway and the network endpoint address of the assigned one of the multiplicity of agents;
    removing the corresponding one of the telephone calls from the call queue and bridging audio between the two-way audio link and the corresponding one of the telephone calls.

12. The device of claim 11, further comprising updating a corresponding voice interaction record in the CSR management computing system at each change of state of handling of the corresponding one of the telephone calls throughout an entire lifecycle of the corresponding one of the telephone calls, through an application programming interface (API) call of the CSR management computing system.

13. The device of claim 11, further comprising retrieving a policy for the queue and executing pre-stored logic associated with the policy.

14. The device of claim 13, wherein the policy includes a courtesy callback option.

15. The device of claim 13, wherein the policy includes a music on hold option.

* * * * *